(12) United States Patent
Laloui et al.

(10) Patent No.: US 11,639,830 B2
(45) Date of Patent: May 2, 2023

(54) HEAT EXCHANGER MODULE AND METHODS OF USING THEREOF

(71) Applicant: ECOLE POLYTECHNIQUE FEDERALE DE LAUSANNE (EPFL), Lausanne (CH)

(72) Inventors: Lyesse Laloui, Ecublens (CH); Alessandro Rotta Loria, Chicago, IL (US)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 93 days.

(21) Appl. No.: 17/602,763

(22) PCT Filed: Mar. 26, 2020

(86) PCT No.: PCT/IB2020/052865
§ 371 (c)(1),
(2) Date: Oct. 10, 2021

(87) PCT Pub. No.: WO2020/208456
PCT Pub. Date: Oct. 15, 2020

(65) Prior Publication Data
US 2022/0178588 A1 Jun. 9, 2022

Related U.S. Application Data

(63) Continuation of application No. PCT/IB2019/052950, filed on Apr. 10, 2019.

(51) Int. Cl.
*F28F 3/12* (2006.01)
*F28D 21/00* (2006.01)
(Continued)

(52) U.S. Cl.
CPC ............ *F28F 3/12* (2013.01); *F28D 21/00* (2013.01); *F28F 23/00* (2013.01); *F24T 10/10* (2018.05);
(Continued)

(58) Field of Classification Search
CPC ............ F28F 2275/02; F28F 255/02; F28F 2013/066; F28F 23/00; F28F 3/12; F28D 21/00; F24T 10/10
See application file for complete search history.

(56) References Cited

U.S. PATENT DOCUMENTS

| 4,106,555 A | 8/1978 | Quintal |
| 4,186,795 A | 2/1980 | Platell |

(Continued)

FOREIGN PATENT DOCUMENTS

| AT | 506596 B1 * | 10/2009 | ............ F24J 2/0438 |
| DE | 2710053 A1 | 9/1977 | |

(Continued)

*Primary Examiner* — Devon Russell
(74) *Attorney, Agent, or Firm* — Maschoff Brennan

(57) ABSTRACT

The invention provides in one embodiment a heat exchanger module (1) comprising a) a flexible support (100); b) at least one tubular member (200) having its main axis substantially parallel with the plane of the flexible support (100); c) a conductive flexible matrix (300) embedding the at least one tubular member (200); and d) a flexible case (400) enwrapping the flexible support (100), the at least one tubular member (200) and the conductive flexible matrix (300). A coating for a built environment comprising a plurality of heat exchanger modules (1) can be implemented, as well as a system further including pumping means (600). The invention also foresees a method for providing heat exchange processes between the heat exchanger module (1), the coating or the system of the invention and a built environment.

20 Claims, 4 Drawing Sheets

(51) Int. Cl.
    *F28F 23/00*     (2006.01)
    *F24T 10/10*     (2018.01)
    *F28F 1/22*     (2006.01)
    *F28F 13/00*     (2006.01)

(52) U.S. Cl.
    CPC ........... *F28F 1/22* (2013.01); *F28F 2013/006* (2013.01); *F28F 2255/02* (2013.01); *F28F 2275/02* (2013.01)

(56) References Cited

U.S. PATENT DOCUMENTS

| | | | |
|---|---|---|---|
| 4,398,529 A | 8/1983 | Schoenfelder | |
| 2005/0051538 A1* | 3/2005 | Guckert | H05B 3/145 |
| | | | 219/544 |
| 2009/0044465 A1 | 2/2009 | Krecke | |
| 2010/0282442 A1* | 11/2010 | Sukuvoy | E04C 2/292 |
| | | | 165/157 |
| 2010/0314081 A1* | 12/2010 | Reis | F28F 21/02 |
| | | | 165/134.1 |
| 2012/0090820 A1* | 4/2012 | Feichtinger | F28F 21/062 |
| | | | 165/135 |
| 2013/0192793 A1 | 8/2013 | Guckert | |
| 2014/0182831 A1 | 7/2014 | Hauenstein | |
| 2015/0191238 A1 | 7/2015 | Hucker | |

FOREIGN PATENT DOCUMENTS

| | | | | |
|---|---|---|---|---|
| DE | 2847905 A1 | 5/1980 | | |
| DE | 19726330 A1 | 2/1999 | | |
| DE | 19740074 A1 | 3/1999 | | |
| DE | 102005034970 A1 | 1/2007 | | |
| DE | 102008011219 A1 | 8/2009 | | |
| DE | 102010021734 A1 | 11/2011 | | |
| EP | 568523 A2 * | 11/1993 | ............... | F24D 3/14 |
| EP | 0626545 A1 | 11/1994 | | |
| EP | 2982914 B1 | 6/2019 | | |
| ES | 1063712 U | 11/2006 | | |
| JP | 2007107288 A | 4/2007 | | |
| JP | 2009221758 A | 10/2009 | | |
| JP | 2017075487 A | 4/2017 | | |
| KR | 20090054856 A | 6/2009 | | |
| KR | 20110004044 A | 1/2011 | | |
| WO | 03/023293 A1 | 3/2003 | | |
| WO | 2005008145 A1 | 1/2005 | | |
| WO | 2006041418 A1 | 4/2006 | | |
| WO | 2009106525 A2 | 9/2009 | | |
| WO | 2010128086 A2 | 11/2010 | | |

\* cited by examiner

HEAT EXCHANGER MODULE AND METHODS OF USING THEREOF

TECHNICAL FIELD

The present invention relates to a thermal energy transfer unit and its applications in e.g. heat exchange processes in a built environment.

BACKGROUND OF THE INVENTION

Geothermal systems harvest the heat naturally present in the ground at any location on Earth through geothermal heat exchangers. These geothermal heat exchangers include closed-loop systems, as well as open-loop systems. In the former case, a heat carrier fluid circulates in a closed piping circuit embedded in the heat exchanger to transfer the ground heat to any built environment via the use of pumps and/or heat pumps. In the latter case, groundwater from a well or an open surface water body is employed through an open piping circuit to transfer the ground heat to any built environment via the use of pumps and/or heat pumps. Geothermal systems use the Earth as a heat source when operating in heating mode, with a fluid as the medium transferring the heat from the Earth to a built environment, thus utilizing geothermal energy. In cooling mode, they use the Earth as a heat sink. Depending on the depth of the application (a typical threshold depth of 400 m is considered for the foregoing), geothermal systems can be divided into shallow geothermal systems and deep geothermal systems. Shallow geothermal systems can offer both heating and cooling at virtually any location, with great flexibility to meet any demands. They can also be used for underground thermal energy storage and de-icing applications.

In recent years, shallow geothermal systems have attracted attention because of their environmentally friendly, cost-effective and efficient character. Underground temperature is nearly constant throughout the year, being lower in the summer compared to the outside temperature, and higher in the winter than the outside temperature. In shallow geothermal systems, advantage is taken of this approximately constant temperature to achieve a favourable heat exchange between the ground (i.e. the primary circuit) and any type of built environment (i.e. the secondary circuit) via the circulation of the heat carrier fluid sustained by pumps and/or heat pumps (i.e. the link between the primary and secondary circuit).

Shallow geothermal systems resort to the installation of a ground heat exchanger (i.e. a piping circuit) to conduct heat exchange with the underground. In general, as a method of installing a geothermal heat exchanger, a hole is drilled by boring or the like, and a steel pipe or a polyethylene pipe or the like is inserted therein. This hole is then filled with a grouting material, which can consist of bentonite, sand or the like, or concrete or the like in situations wherein pipes are embedded in structural elements such as pile foundations, retaining walls, tunnels or the like. A liquid solution (typically consisting of water or water comprising an anti-freeze) is typically circulated in the pipes of the geothermal heat exchanger installed in this way, and the system performs heat exchange with underground.

These types of geothermal heat exchangers can be configured to suitably work in several types of built environments, such as domestic or industrial buildings. However, three main shortcomings can be associated with geothermal heat exchangers: (1) the geothermal heat exchangers are typically not maintainable or replaceable; (2) difficulties related to the pipe installation can be encountered due to the need of fixing or embedding the pipes to or within rigid and non-modular elements that are subsequently filled with appropriate material; and (3) time is needed to install the piping circuit during the construction of the geothermal heat exchangers. Aspect (1) poses several problems linked to the maintenance, replacement and/or fixing in case of malfunctioning. Aspects (2) and (3) require time during the construction of the structure or infrastructure, which may affect its critical path. Moreover, modularity and mechanical rigidity of heat exchange devices is still representing a limiting step to the broad spreading of heat exchangers for the recovery of waste heat in each and every built environment.

SUMMARY OF THE INVENTION

In order to address and overcome at least some of the above-mentioned drawbacks of the prior art solutions, the present inventors developed a new kind of heat exchanger device having improved features and capabilities.

The purpose of the present invention is therefore that of providing a heat exchanger module that overcomes or at least reduces the above-summarized drawbacks affecting known solutions according to the prior art.

In particular, a first purpose of the present invention is that of providing a modular heat exchanger unit to be used as a coating or covering exploiting geothermal energy or any source of waste heat in order to supply structures and infrastructures having certain energy requirements.

A further purpose of the present invention is that of providing a modular heat exchanger unit to be used as a coating solution for energy transfer which is easy to install, to replace and to maintain over time. Furthermore, the modular heat exchanger unit can be made recyclable and/or fire-resistant. An optional rectangular shape of the modular heat exchanger unit makes it very easy to connect multiple modular heat exchanger units together to enable modular applications.

Still a further purpose of the present invention is that of providing a modular heat exchanger unit to be used as a coating solution for energy transfer which is flexible and applicable to any surface.

Still a further purpose of the present invention is that of providing a modular heat exchanger unit to be used as a coating solution for energy transfer which is environmentally friendly and associated with a low cost of production and exploitation.

All those aims have been accomplished with the present invention, as described herein and in the appended claims.

In view of the above-summarized drawbacks and/or problems affecting heat exchangers of the prior art, according to the present invention there is provided a heat exchanger module according to claim 1.

Another object of the present invention relates to a coating for a built environment comprising a plurality of flexible heat exchanger modules according to the present disclosure.

Still another object of the present invention relates to the use of a heat exchanger module and/or of a coating for a built environment according to the present disclosure for heat exchange processes between said heat exchanger module, and/or said coating, and a built environment.

Still another object of the present invention relates to a method for providing heat exchange in a built environment. Advantageously, the built environment can be an environment characterised by a temperature having a variation of maximum ±5° C. Underground car parks, metro and train lines, malls, or the like are examples of these environments. Further embodiments of the present invention are defined by the appended claims.

The above and other objects, features and advantages of the herein presented subject-matter will become more apparent from a study of the following description with reference to the attached figures showing some preferred aspects of said subject-matter.

DETAILED DESCRIPTION OF THE INVENTION

Figure 1:
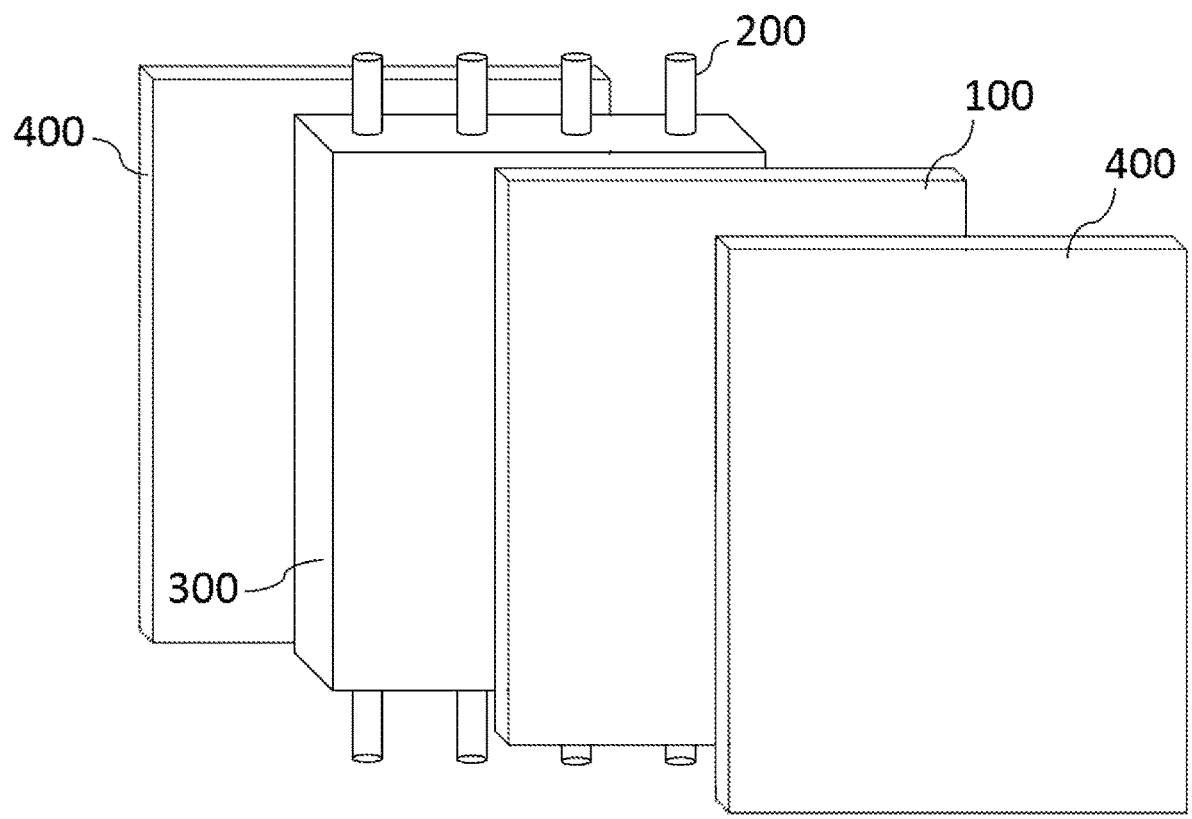
FIG. 1 depicts in an exploded view a portion of a heat exchanger module according to an embodiment of the invention.

The present invention herein described will be clarified in the following by means of the following description of those embodiments which are depicted in the drawings. It is however to be understood that the present invention is not limited to the embodiments described in the following and depicted in the drawings; to the contrary, the scope of the present invention herein described is defined by the claims. Moreover, it is to be understood that the specific conditions or parameters described and/or shown in the following are not for limiting the subject-matter herein described, and that the terminology used herein is for the purpose of describing particular embodiments of the present invention by way of example only and is not intended to be limiting.

Unless defined otherwise, technical and scientific terms used herein have the same meaning as commonly understood by one of ordinary skill in the art to which this invention belongs. Further, unless otherwise required by the context, singular terms shall include pluralities and plural terms shall include the singular. The methods and techniques of the present disclosure are generally performed according to conventional methods well known in the art and as described in various general and more specific references that are cited and discussed throughout the present specification unless otherwise indicated. Further, for the sake of clarity, the use of the term "about" is herein intended to encompass a variation of +/−10% of a given value.

Non-limiting aspects of the subject-matter of the present disclosure will be described by way of example with reference to the accompanying figures, which are schematic and are not intended to be drawn to scale. For purposes of clarity, not every component is labelled in every figure, nor is every component of each aspect of the invention shown where illustration is not necessary to allow those of ordinary skill in the art to understand the invention.

The invention will be better understood with the use of the following definitions. As used in the following and in the appended claims, the singular forms "a", "an" and "the" include plural referents unless the context clearly dictates otherwise. Also, the use of "or" means "and/or" unless stated otherwise. Similarly, "comprise", "comprises", "comprising", "include", "includes" and "including" are interchangeable and not intended to be limiting. It is to be further understood that where for the description of various embodiments use is made of the term "comprising", those skilled in the art will understand that in some specific instances, an embodiment can be alternatively described using language "consisting essentially of" or "consisting of."

As used herein, a "polymeric material" is any material comprising polymers, large molecules (also known as macromolecules) composed of many repeated smaller units, or subunits, called monomers, tightly bonded together preferably by covalent bonds. Polymer architecture at the molecular scale can be rather diverse. A linear polymer consists of a long linear chain of monomers. A branched polymer comprises a long backbone chain with several short side-chain branches covalently attached. Cross-linked polymers have monomers of one long or short chain covalently bonded with monomers of another short or long chain. Cross-linking results in a three-dimensional molecular network; the whole polymer is a giant macromolecule. Another useful classification of polymers is based on the chemical type of the monomers: homopolymers consist of monomers of the same type, copolymers have different repeating units. Furthermore, depending on the arrangement of the types of monomers in the polymer chain, there is the following classification: the different repeating units are distributed randomly (random copolymer) or there are alternating sequences of the different monomers (alternating copolymers), in block copolymers long sequences of one monomer type are followed by long sequences of another type; and graft copolymers consist of a chain made from one type of monomer with branches of another type. A sufficiently dense polymer solution can be crosslinked to form a polymer gel, including a hydrogel or a Cryogel®, which is a soft solid.

Polymer materials may also be formed by blending two or more polymers into physical mixtures. For example, the rather poor impact strength of polystyrene is greatly improved by incorporating small particles of an elastomer. Many properties of polymeric materials depend on the microscopic arrangement of their molecules. Polymers can have an amorphous (disordered) or semicrystalline (partially crystalline, partially ordered) structure. Polymers can be mixed with organic or inorganic particles, usually in the form of continuous fibres or particulates such as carbon fibres, conductive metal particles, metal flakes and the like in order to modify and improve for instance their mechanical or thermal properties.

Suitable polymers according to the present disclosure may comprise one or more compounds selected from a non-exhaustive list comprising thermosets or thermoplastics, such as styrene butadiene styrene (SBS) or styrene ethylene butylene styrene (SEBS), alkyds, epoxies, phenolics (e.g., Bakelite), polyimides, formaldehyde resins (e.g., urea formaldehyde or melamine formaldehyde), polyester thermosets, unsaturated polyesters, polyurethane, bis-maleimides (BMI), polyvinyl chloride (PVC), neoprene, uncrosslinked neoprene, polyethylene (PE), cross-linked polyethylene (PEX), polyether, ethylene-vinyl acetate (EVA), polyethylene-vinyl acetate (PEVA), polypropylene glycol (PPG), latex, elastomeric materials, such as silicone rubber (e.g., polydimethylsiloxane PDMS) or fluorosilicone rubber, thermoplastic elastomers, such as styrenic block copolymer (SBC), ethylene propylene diene monomer (EDPM) rubber, butyl rubber, nitrile rubber, poly(lactic-co-glycolic acid) (PLGA), lactide and glycolide polymers, caprolactone polymers, hydroxybutyric acid, polyanhydrides, polyesters, polyphosphazenes, polyphosphoesters and poly(glycerol sebacate acrylate), polypropylene, polypropylenoxide or their derivatives, polymethylenoxide or its derivatives, polyethylene or its derivatives, such as polyethylene glycole (PEG), polyethylenoxide or their derivatives, polyacrylate or its derivatives, such as poly(2-hydroxyethylmethacrylate) (PHEMA), poly(vinyl alcohol) (PVA), poly(lactic acid), poly(methacrylic acid), and copolymers, poly(vinylpyrrolidone) (PVP) and combinations thereof, as well as any combination of the foregoing.

The polymeric materials according to the present invention are preferably used to form a soft matrix, so to obtain a soft polymeric material. In the context of the present disclosure, the expression "soft polymeric material" refers to a polymeric material which is compressible, reversibly compressible, plastically stretchable, reversibly stretchable (elastic), flexible or any combination thereof. The term "stretchable" is herein used to mean an intrinsic or engineered property of a material or structure that allows such material or structure to undergo a large elongation upon a strain stress, typically of >5% of the length of a soft structure at rest, such as for instance more than about 10%, more than about 20%, more than about 50%, more than about 100% or even more than about 200% of a soft structure at rest.

As used herein, the term "gel" refers to a non-fluid colloidal network or polymer network that is expanded throughout its whole volume by a fluid. A gel is a solid three-dimensional network that spans the volume of a liquid medium and ensnares it through surface tension effects. The internal network structure may result from physical bonds (physical gels) or chemical bonds (chemical gels).

As used herein, the term "hydrogel" refers to a gel in which the swelling agent is water. A hydrogel is a macromolecular polymer gel constructed of a network of cross-linked polymer chains. It is synthesized from hydrophilic monomers, sometimes found as a colloidal gel in which water is the dispersion medium. Hydrogels are highly absorbent (they can contain over 90% water) natural or synthetic polymeric networks. As a result of their characteristics, hydrogels develop typical firm yet elastic mechanical properties.

The expressions "film" or "thin film" relate to the thin form factor of an element of the device of the invention, such as a flexible support. Generally speaking, a "film" or "thin film" as used herein relates to a layer of a material having a thickness much smaller than the other dimensions, e.g. at least one fifth compared to the other dimensions, which would typically be orthogonal dimensions to the thickness. Typically, a film is a solid layer having an upper surface and a bottom surface, with any suitable shape, and a thickness generally in the order of micrometres or millimetres, depending on the needs and circumstances, e.g. the manufacturing steps used to produce it. In some embodiments, films according to the invention have a thickness comprised between 0.1 µm and 5 mm, such as between 5 µm and 5 mm, between 5 µm and 1 mm, between 10 µm and 1 mm, between 5 µm and 500 µm, between 50 µm and 500 µm, between 50 µm and 150 µm, between 100 µm and 500 µm or between 200 µm and 500 µm.

The term "flexible" is used herein to refer to elements of the heat exchanger module that can perform a deflection upon application of a deflecting force thereon. Generally speaking, the term "deflection" refers to any displacement, expansion, contraction, bending, torsion, twist, linear or area strain, or any other kind of deformation, of at least a portion of the element it refers to.

An "aqueous solution" is a solution in which the solvent is substantially made of water. In the context of the present disclosure, the term "aqueous" means pertaining to, related to, similar to, or dissolved in water. The expression aqueous solution in the context of the present disclosure includes water itself, highly concentrated and/or viscous solutions, such as for instance hydrogels, syrups (i.e., saturated water/sugar solutions) and the like, in which the water weight content is e.g. less than 5% of the total solution weight. Solutions of liquids and solid particles, including conductive particles, conductive nanotubes and/or magnetic particles, as well as combinations of different liquids that allow for an energy transfer, are also included herein.

A "non-polar solution" is a solution in which the solvent is a non-polar compound. Non-polar solvents are intended to be compounds having low dielectric constants and that are not miscible with water. A non-exhaustive list of non-polar solutions can comprise for example solutions comprising oils, benzene, carbon tetrachloride, chloroform, dichloromethane, diethyl ether, xylene, toluene, ethanol, hexanol, heptanol, decanol, dodecanol, hydrocarbon-based solutions (e.g. hexane, cyclohexane, n-octane, isooctane, decane, hexadecane and the like), fluorophilic solvents, ethyl acetate, silicon oils, mineral oils, oils used for food and so forth. An "oil" is any non-polar chemical substance that is a liquid at ambient temperatures and is both hydrophobic and lipophilic. Solutions of liquids and solid particles, including conductive particles, conductive nanotubes and/or magnetic particles, as well as combinations of different liquids that allow for an energy transfer, are also included herein.

By "composite material" or "composite" is herein meant a material made from two or more constituent materials with significantly different physical or chemical properties that, when combined, produce a material with characteristics different from the individual components. The individual components remain separate and distinct within the finished structure, differentiating composites from mixtures and solid solutions.

Figure 2:
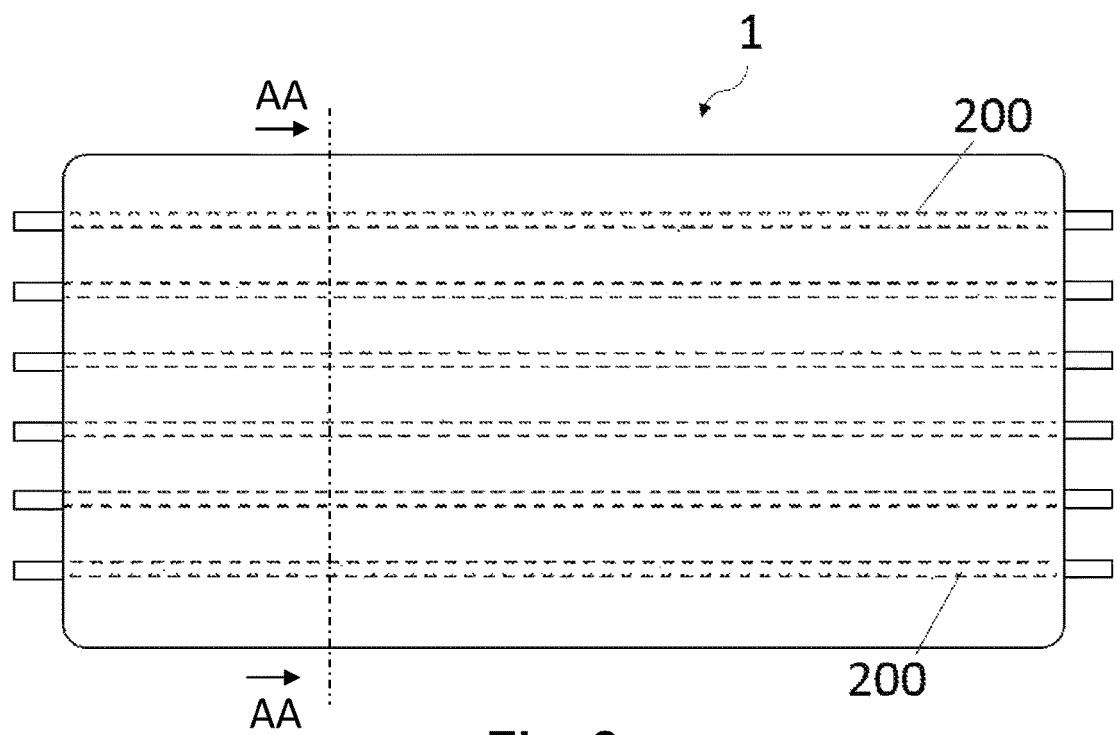
FIG. 2 is a top view showing the heat exchanger module according to FIG. 1, where the tubular elements are shown as dotted lines.
Figure 3:
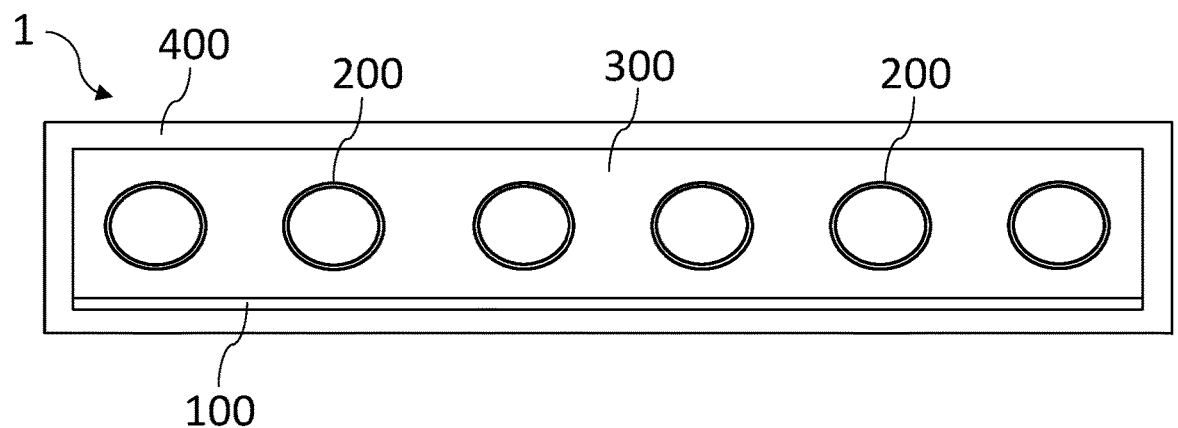
FIG. 3 depicts in a cross-sectional view along the plane AA, shown in FIG. 2, the heat exchanger module of FIG. 2.

With reference to FIGS. 1 to 3, one embodiment of the heat exchanger module 1 according to the invention is shown. In this particular embodiment the heat exchanger module 1 is made flexible, but it could be rigid instead. In this case, at least some or all of the separate elements forming the heat exchanger module 1 would be rigid instead of being flexible. Thus, according to this embodiment, said module comprises a) a flexible support 100, which in the state shown in FIG. 1 is substantially flat; b) at least one hollow tubular member 200, a pipe or a tube, having its longitudinal or main axis substantially parallel with a plane defined by a surface of the flexible support 100; c) a conductive flexible matrix 300 at least partially embedding the at least one tubular member 200; and d) a flexible case, cover or envelop 400 at least partially enwrapping the flexible support 100, the at least one tubular member 200 and the conductive flexible matrix 300. It is to be noted that the longitudinal axis of the tubular member may not have to be a straight axis. In other words, the longitudinal axis of the tubular member may be understood to longitudinally follow the shape of the tubular member between its first end, and a second, opposite end. The case 400 has an inside facing face or surface and an outside facing face or surface. The case 400 may be considered to form a finishing layer around the flexible support 100 and the matrix 300. The case may be arranged loosely or tightly around the flexible support 100 and the matrix 300. Furthermore, the matrix may comprise an adhesive, glue-like or sticky surface to increase friction between the matrix and elements that are in contact with it. It is to be noted that the support 100, the at least one tubular member 200, the matrix 300 and the case 400 are all thermally conductive elements in the present example. As shown in FIG. 3, the support 100 and the matrix 300 may be considered to be sandwiched between opposite inside facing surfaces of the case when the case is folded around the support and the matrix. A first or front face or surface of the support is thus in direct contact with the inside facing surface of the case, while a second or back face of the support is in direct contact with a first or front face of the matrix, while a second or back face of the matrix is in direct contact with the (opposite) inside facing surface of the case. It is to be noted that the tubular member may have a circular cross-section (orthogonally to the main axis of the tubular member) or any other suitable shape to allow a fluid to flow inside it.

The flexible support 100 is generally intended for structurally supporting the entire structure, including the tubular member 200, the conductive flexible matrix 300 and the flexible case 400, while keeping the entire module 1 as flexible and conductive as possible. In this context, the flexible support 100 can be substantially composed of any materials provided that the entire module structure 1 remains flexible. Exemplary materials comprise conductive materials such as metals including without limitation copper, aluminium, stainless steel, iron and the like, and/or plastic polymers or composite materials comprising without limitations polyvinyl chloride (PVC), polyethylene (PE), cross-linked polyethylene (PEX) optionally including (in the case of composites particles) micro/nanotubes or micro/nanostructures, flakes and the like of conductive materials, such as carbon, aluminium, copper, etc.

In one embodiment, the flexible support 100 can be implemented to comprise one of a thin film of a thermally conductive material, a net support of a conductive material, such as a galvanized electro-welded net, and a wire rope mesh. The thickness of the flexible support 100 can be of less than 10 mm, such as for instance comprised between about 0.5 mm and about 5 mm, between about 1 mm and about 5 mm, between about 1 mm and about 3 mm or between about 1 mm and about 2 mm. The thin form factor of the support 100, as well as the engineered structure in the case of a net support, facilitates its deflection along one or more axes depending on the needs and circumstances, yet remaining lightweight, thermally conductive and sufficiently resistant.

A tubular member 200 is operably connected to the matrix 300 by any suitable means readily available to a person skilled in the art, such as gluing, welding, soldering and the like. The connection may instead, or in addition, be a form-fit connection. The tubular member 200 is configured to circulate a fluid and comprises, in its simplest form, an inlet, an outlet and a hollow elongated body extending between the inlet and the outlet, and it is adapted to allow a working fluid to flow between the inlet and outlet. The tubular member 200 is designed to favour thermal exchanges between the working fluid and the external environment. In this context, the number, location and/or the design of the tubular member(s) 200, as well as the material(s) it is (they are) substantially composed of, play a role in both the heat exchange process and the flexibility of the entire module 1, while keeping the structure low cost and possibly recyclable.

Figure 4:
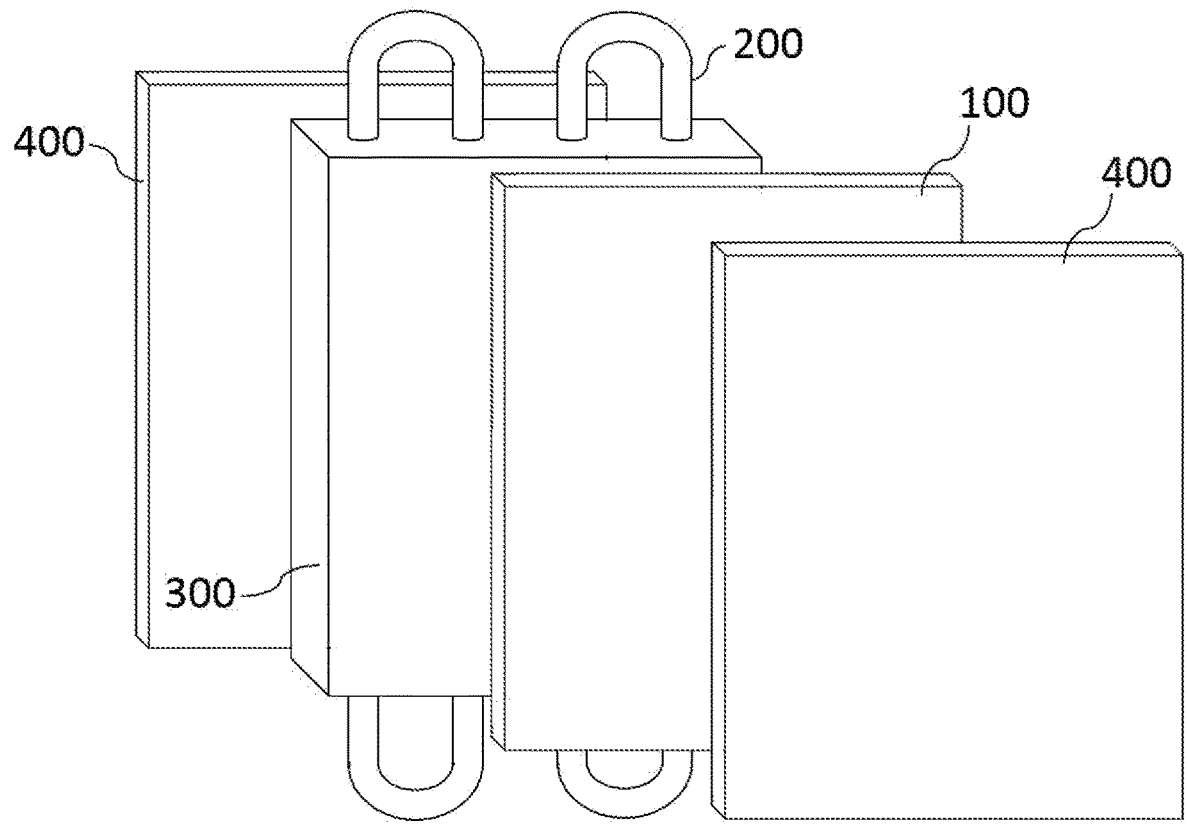
FIG. 4 depicts in an exploded view a portion of a heat exchanger module according to another embodiment of the invention, where a single tubular element is embodied as a serpentine.
Figure 5:
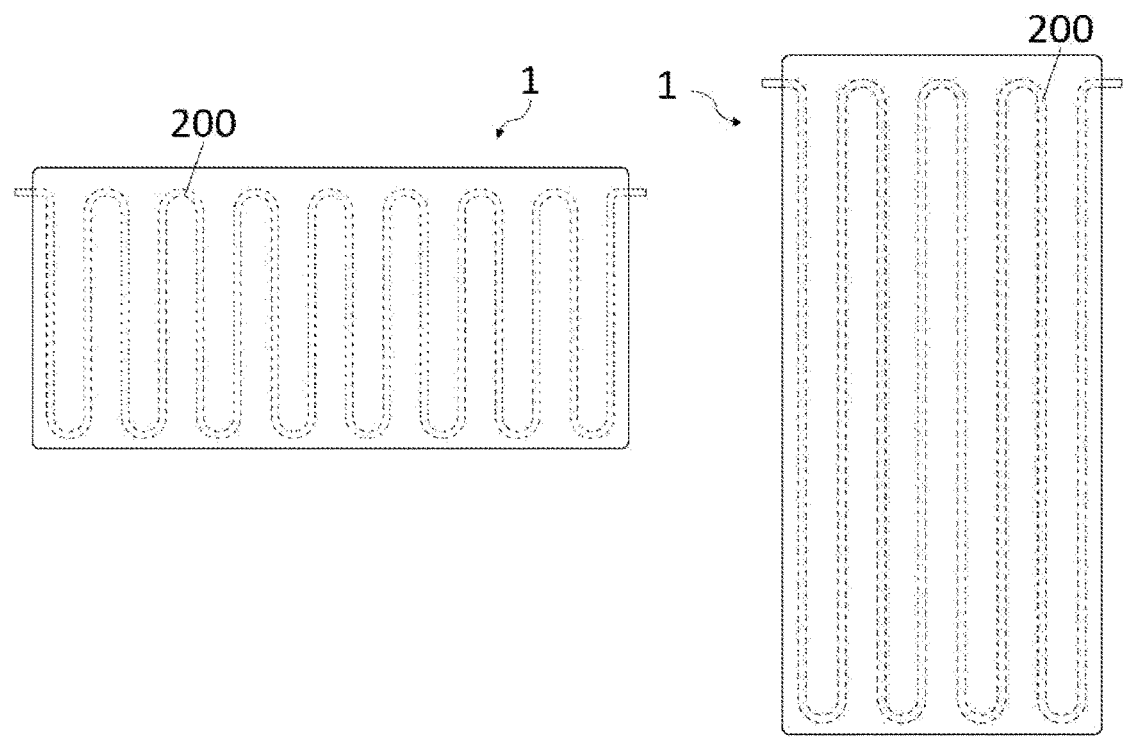
FIG. 5 is a top view showing two heat exchanger modules according to the teachings of the embodiment of FIG. 4, where tubular elements are embodied as a serpentine.

As a way of example of the above requirements, in order to enhance the thermal interactions between the tubular member 200 and the external environment, in a preferred embodiment, the main axis of the tubular body of the tubular element 200 is substantially parallel with the plane of the heat exchanger module 1 so to have a greater contact area with the external environment, such as an external contact surface, to which the heat exchanger module may be attached. It is to be noted that in the present description, the word "plane" is to be understood broadly, and thus it is understood to cover substantially flat surfaces but also curved or three-dimensional surfaces (curved planes). Moreover, a plurality of tubular elements 200 can be present and they may optionally be distributed substantially parallel to each other along the plane of the heat exchanger module 1, as shown in FIGS. 1 to 3. Additionally or alternatively, as exemplarily shown in FIGS. 4 and 5, the at least one tubular member 200 is configured as a serpentine structure distributed along the plane of the module 1. Alternatively or additionally, the at least one tubular member 200 is configured as a space-filling curve, such as for instance a Peano curve or a Hilbert curve.

In particular, in preferred embodiments of the heat exchanger module 1 according to the invention, the at least one tubular member 200 is substantially made of a material having a thermal conductivity at 20° C. greater than 0.2 W/(m·° C.), preferably between about 0.2 and about 400 W/(m·° C.), such as between about 1 and about 400 W/(m·° C.), between about 10 and about 350 W/(m·° C.), between about 50 and about 300 W/(m·° C.) or between about 100 and about 200 W/(m·° C.). In exemplary embodiments, the tubular member 200 is substantially made of one or more metals, of a thermoset, of a thermoplastic or of combinations of the foregoing, such as for instance, and without limitations, copper, aluminium and the like, and/or of plastic polymers or composite materials comprising without limitations polyvinyl chloride (PVC), polyethylene (PE), cross-linked polyethylene (PEX) optionally including (in the case of composites particles) micro/nanotubes or micro/nanostructures, flakes and the like of conductive materials, such as carbon, aluminium, copper, etc. Plastic polymeric materials are considered an effective option according to the invention in view of their good balance between the ease of manufacturing, the lightness, the robustness, the flexibility, the thermal properties and the low cost.

In some embodiments, the thickness of the walls composing the tubular member(s) 200 may be of up to 3 mm, such as for instance between about 0.5 and 2 mm or between about 1 and 3 mm. Preferably, the density of the tubular member material should be greater than 500 kg/m$^3$. Preferably, the external tubular member diameter should be lower than 40 mm, such as for instance between about 10 mm and about 30 mm or between about 20 mm and 40 mm, to keep the thickness of the heat exchanger module 1 small yet providing flexibility for most materials that can be found in practice and used for the tubular member(s) 200.

Importantly, in any embodiments of the invention in which more than one elongated hollow body or body section is present—as in the case of a serpentine structure, a space-filling curve or in the presence of a plurality of e.g. parallel tubular members 200—a minimum normalised spacing between said elongated hollow bodies or body sections shall be of s/d=6, where s is the centre-to-centre spacing between any two adjacent elongated hollow bodies (or "pipes") and d is the external diameter of the body or body section. In this manner optimal thermal performance can be ensured while maintaining flexibility and deformability of the module 1. More specifically, the s/d ratio can be of at least 7, at least 8, at least 9 or at least 10. As used herein, the expression "optimal performance" refers to a condition wherein the heat exchanger allows achieving at least 10 Watts per metre square of its surface under steady conditions.

One further feature of the heat exchanger module 1 of the present invention relies on the presence of a conductive flexible matrix 300 embedding the at least one tubular member 200. The conductive flexible matrix 300 mechanically stabilizes the entire structure and facilitates thermal exchanges when appropriate materials are used. The conductive flexible matrix 300 is provided in some embodiments in the form of a paste, a gel, a hydrogel or a semi-solid soft matrix, having a thermal conductivity at 20° C. greater than 0.1 W/(m·° C.), preferably between about 1 and 100 W/(m·° C.), to ensure optimal thermal performance. The conductive flexible matrix 300 is configured to embed the tubular member(s) 200 so that when considering the thickness of the matrix, up to 10 mm, such as between about 0.2 and 10 mm matrix material is present between the tubular element and the matrix outer surface (cross-sectionally on both sides of the tubular member) to ensure optimal thermal performance of the heat exchanger module 1. In one embodiment, the conductive flexible matrix 300 comprises a polymeric matrix comprising at least one of a thermoset, a thermoplastic and an elastomer. In one embodiment, the conductive flexible matrix 300 comprises tar oil.

In one embodiment, the conductive flexible matrix 300 comprises a composite material. Accordingly, the conductive flexible matrix 300 can comprise polymeric materials including conductive fibres, particles, flakes and the like to enhance the material thermal conductivity; suitable materials for those conductive fibres, particles, flakes etc. are, without limitations, metallic materials such as iron, copper, aluminium, stainless steel and the like.

As previously anticipated, the tubular member 200 is configured and conceived to allow a working fluid to flow within its hollow body or bodies (or body sections), so to favour thermal exchanges between the working fluid and the external environment. Accordingly, in one embodiment the at least one tubular member 200 comprises a fluid having a thermal conductivity at 20° C. greater than 0.5 W/(m·° C.), preferably between about 0.5 and about 10 W/(m·° C.), such as between about 1 and about 8 W/(m·° C.), or between about 2 and about 5 W/(m·° C.). In the embodiments of the invention, the fluid is at least one of an aqueous solution, including water; a non-polar solution, carbon dioxide and liquids comprising conductive particles. Suitable circulating fluids are for instance and without limitations pure water, water-based mixtures including, for example, antifreeze liquids, oils as well as liquids including particulates deriving from highly conductive materials, such as for example graphite powder and aluminium particulates.

In some of embodiments, the flexible heat exchanger module 1 of the invention is characterised in that:
i) the flexible flat support is a galvanized electro-welded net;
ii) the at least one tubular member is a serpentine structure substantially made of a material selected from a list comprising or consisting of a thermoset material, a thermoplastic material and a metal;
iii) the fluid is an aqueous solution, including water; and
iv) the conductive flexible matrix is substantially made of a material selected from a list comprising or consisting of tar oil, an elastomeric glue and a metal particles/elastomeric glue composite.

The above solutions typically provide flexibility and bendability in at least one direction (e.g., parallel to the longitudinal axis of the tubular members), while resorting to materials whose thermal properties provide robustness, cost-effectiveness and/or an efficient energy yield through the heat exchanger module.

In one embodiment, the flexible heat exchanger module 1 of the invention is characterised in that:
i) the flexible flat support is a galvanized electro-welded net;
ii) the at least one tubular member is a serpentine structure substantially made of a thermoset or a thermoplastic;
iii) the fluid is an aqueous solution, including water; and
iv) the conductive flexible matrix is substantially made of tar oil.

In one embodiment, the flexible heat exchanger module 1 of the invention is characterised in that:
i) the flexible flat support is a galvanized electro-welded net;
ii) the at least one tubular member is a serpentine structure substantially made of a metal;
iii) the fluid is an aqueous solution, including water; and
iv) the conductive flexible matrix is substantially made of an elastomeric glue.

In one embodiment, the flexible heat exchanger module 1 of the invention is characterised in that:
i) the flexible flat support is a galvanized electro-welded net;
ii) the at least one tubular member is a serpentine structure substantially made of a metal;
iii) the fluid is an aqueous solution, including water; and
iv) the conductive flexible matrix is substantially made of metal particles/elastomeric glue composite.

Figure 6:
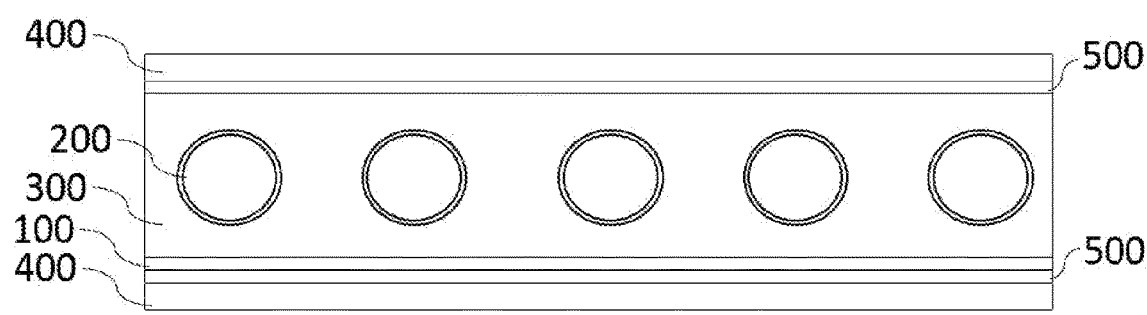
FIG. 6 is a cross-sectional view showing a portion of a heat exchanger module according to another embodiment of the invention, where the module comprises steam break layers.

Finally, the flexible heat exchanger module 1 according to the present embodiments comprises a flexible case or cover 400, which in this example is formed as one physical element, enwrapping the flexible support 100, the at least one tubular member 200 and the conductive flexible matrix 300. Said flexible case 400 is conceived to enclose and protect the entire structure or substantially entire structure, while still keeping it flexible and thermally conductive. More, specifically, according to the present embodiments, the case enwraps the entire structure apart from openings in the case to allow the tubular members to pass through. Based on this, many different materials and structures can be used for manufacturing said flexible case 400, as will be readily evident to a person skilled in the art. In one embodiment, the flexible case 400 is a textile case made e.g. of cellulose, plastic sheets or wire meshes. In still another embodiment, the flexible heat exchanger module 1 according to the present invention further comprises at least one steam break sheet 500, also known as a vapour barrier sheet or vapour barrier (FIG. 6), which in this embodiment is placed between the conductive flexible matrix 300 and the case 400 (in this example on both sides of the matrix). A "steam break sheet" is an item, typically a sheet or thin film of plastic or a foil sheet, substantially made of a material that resists diffusion of moisture. Permeability can be reported in perms, a measure of the rate of transfer of water vapour through a material (1.0 US perm=1.0 grain/square-foot·hour·inch of mercury ≈57 SI perm=57 ng/s·m2·Pa). Depending on the moisture vapour transmission rate (MVTR), vapour barrier materials can be categorized as impermeable (1 US perm, or 57 SI perm)—such as asphalt-backed kraft paper, elastomeric coating, vapour-retarding paint, oil-based paints, vinyl wall coverings, extruded polystyrene, plywood, aspenite; semi-permeable (1-10 US perm, or 57-570 SI perm)—such as unfaced expanded polystyrene, fibre-faced isocyanurate, heavy asphalt-impregnated building papers, some latex-based paints); or permeable (>10 US perm, or >570 SI perm)—such as unpainted gypsum board and plaster, unfaced fibre glass insulation, cellulose insulation, unpainted stucco, cement sheathings, spunbonded polyolefin or some polymer-based exterior air barrier films. In some embodiments according to the invention, the steam break sheet 500 is substantially made of impermeable or semi-impermeable materials. The heat exchanger module 1 can comprise one or more steam break sheets 500, placed on the side of said module 1 where contact is made with a solid material (e.g., a wall). In embodiments in which the heat exchanger is sandwiched within one or more elements, the barrier 500 may be placed on the two opposing sides.

Figure 7:
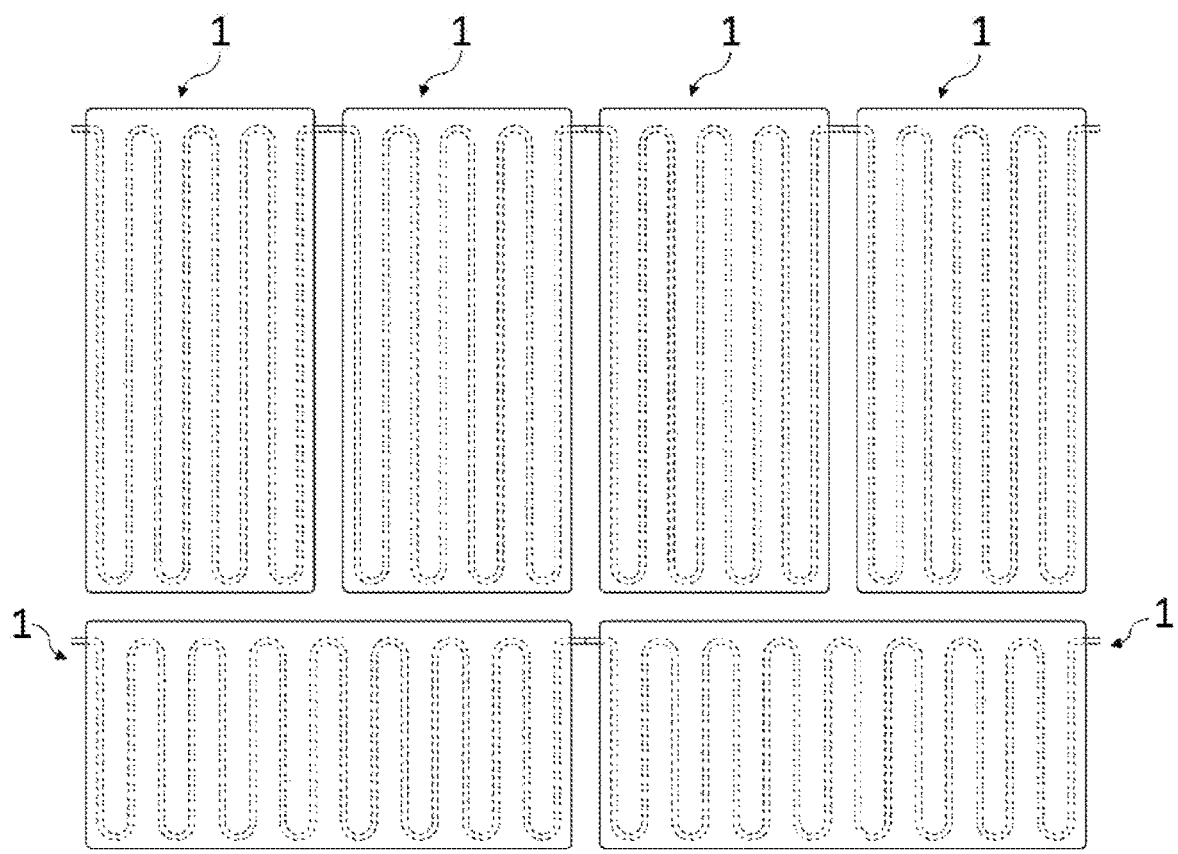
FIG. 7 depicts in a top view two coatings according to an embodiment of the invention, where each coating comprises a plurality of heat exchanger modules of the invention.
Figure 8:
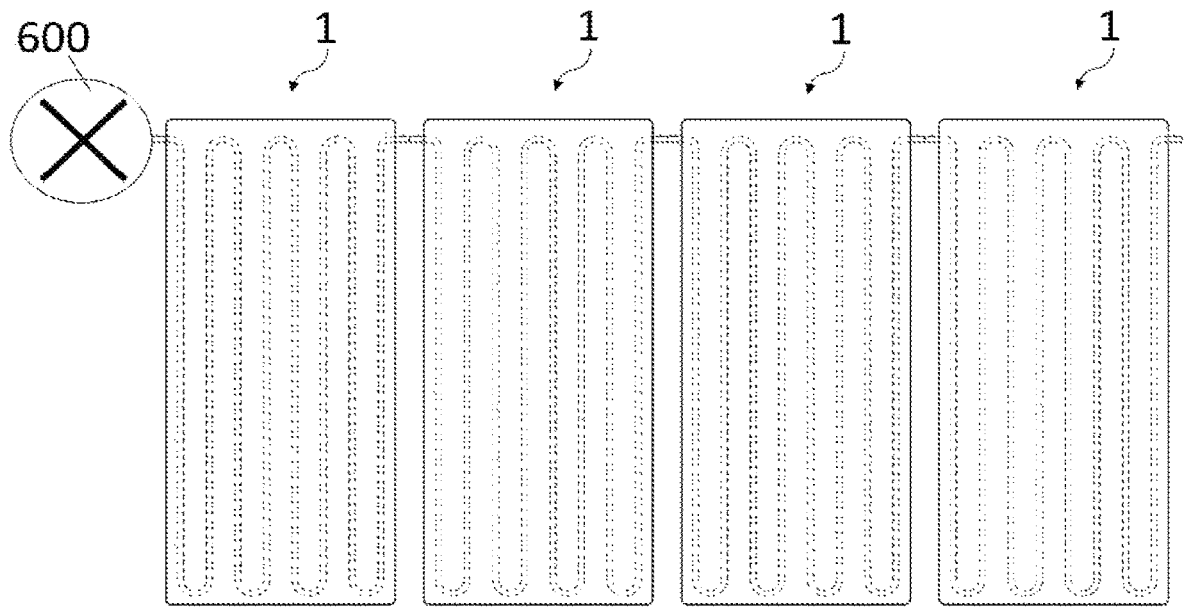
FIG. 8 shows a system according to an embodiment of the invention, where the system comprises a coating having a plurality of heat exchanger modules operatively connected to pumping means.

Another object of the present invention relates to a coating or covering for a built environment or structure comprising a plurality of flexible heat exchanger modules according to the present invention (FIG. 7). Still another object of the present invention relates to a system comprising i) a flexible heat exchanger module and/or a coating for a built structure according to the invention and ii) pumping means 600 operatively connected to the tubular member(s) 200 of said flexible heat exchanger module and/or coating (FIG. 8).

Still another object of the present invention relates to the use of a flexible heat exchanger module, a coating for a built structure and/or system according to the present invention for heat exchange processes between said heat exchanger module, said coating and/or said system and a built environment. The plurality of flexible heat exchanger modules in a coating according to the present embodiment can be possibly operatively connected between them optionally through the tubular elements, depending on the needs and circumstances. For instance, a coating according to the present embodiment can comprise several heat exchanger modules connected between them via the inlets and/or the outlets of the tubular member(s) 200 in such a way to create (a) working fluid circuit(s) connected in parallel and/or in series. Thus, the coating may comprise a set of heat exchanger modules arranged side by side (i.e. in this case not stacked on top of each other), optionally in a single plane, which may be a two-dimensional plane or a three-dimensional plane. Said circuit(s) can also be configured in order to transfer the exchanged heat to further external environments, such as built environments at a certain distance from the built environments they are connected to. As it will be evident, a single heat exchanger module 1 according to the invention can perform the same way on a smaller scale.

In one embodiment, the built environment is characterised by a constant temperature, a substantially constant temperature, or a temperature having a maximum variation of ±5° C. In these situations, the built environment functions as a heat exchanger. As previously stated, this is typical for underground environments, which may or may not be in direct contact with the ground. As a way of example, the built environment employed as a heat exchanger can be an underground environment, such as for instance a road tunnel, a train tunnel, a parking space, a basement/cellar, buildings' foundations, a technical room, an underground laboratory and the like. Since the temperature at shallow depths remains relatively constant or substantially constant throughout the year, being warmer than the ambient temperature during cold seasons and cooler during hot seasons, the products of the present invention permit harvesting renewable (geothermal) energy independently of the weather, continuously and everywhere on Earth. Therefore, continuous transfers of heating and cooling can be achieved with the potential to supply up to 100% of the energy requirements of constructions in an environmentally friendly way, due to its minimum contribution to greenhouse gas emissions. In addition to these features, the products of the invention are easily installed on any surface, maintainable and replaceable. As a way of example, the built environment employed as a heat source can be an underground environment but also environments (potentially located above the surface) in which waste heat can be captured, such as data centres and other environments wherein thermal energy can be captured and transferred to other environments upon the need. Other situations include built environments characterised by significant heat sources. In these situations, the environment functions as a heat source: heat is captured through the heat exchanger and transferred in other environments for heating purposes.

Additionally or alternatively, a built environment having a temperature with a maximum variation of ±5° C. can be for instance an equipment room, a swimming pool, certain areas of a power plant (including underground compartments), working environments, such as a bakery and the like.

Based on the above considerations, the heat exchanger module and/or coating of the invention allow achieving a favourable heat exchange between any environment, such as underground environments, and other built environments, everywhere and continuously, for the purposes of (i) heating and cooling to reach comfort levels in the built environment, (ii) contributing to the production of hot water, (iii) providing heat to prevent the icing of pavements and decks of structures and infrastructures, and (iv) storing heat in the subsurface for a successive use, to mention a few.

As it will be apparent to a person skilled in the art, another object of the present invention relates to a method for providing heat exchange in a built environment, said method comprising the steps of:

a) applying a flexible heat exchanger module, and/or a coating, according to the present invention to a built structure located in said built environment; and b) allow a fluid to flow within at least one tubular member of said heat exchanger module and/or coating.

In some embodiments of the method of the invention, the built environment is characterised by a temperature having a maximum variation of ±5° C. In some embodiments of the method of the invention, the built environment is an underground environment.

In particular, the method of the invention foresees a first step of operatively connecting a flexible heat exchanger module, and/or a coating, according to the present invention to at least a portion of a structure of a built environment, typically walls and/or roofs of said built environment, in a way that heat exchange can be functionally achieved between the module and/or the coating of the invention and said structure. To this end, the module(s) can be glued, soldered or otherwise fixed to a built structure by any way readily available to a skilled person, provided that the surface(s) of the module(s) is (are) sufficiently close to the built structure for an advantageous heat exchange to happen, and provided that the fixation means do not alter the functioning of the module(s). The modules may be in intimate contact with the built structure (or target surface) such that the modules may be shaped to follow the surface shape of the target surface. As a way of example, the module(s) can be connected to a built structure via the borders of the flexible case 400, so to minimize the surface used for the fixation.

In a second step, a working fluid as previously described is loaded into the inlet(s) of the tubular structure(s) 200 and pumped to flow along the pipe(s) formed by the tubular structure(s). This application can be achieved via the use of pressure means such as pumps and/or heat pumps. The working fluid thus acts as a heat exchange medium. It is to be noted that the tubular structure may or may not form a closed loop or circuit. Alternatively, the module(s) and/or coating can be pre-loaded with a working fluid, which is thereafter allowed/forced to flow along the pipe(s).

The invention claimed is:

1. A heat exchanger module comprising:
   a) a thermally conductive support comprising a surface defining a plane;
   b) at least one thermally conductive hollow tubular member having its longitudinal axis substantially parallel with the plane;
   c) a thermally conductive matrix at least partially embedding the at least one tubular member, the conductive matrix being supported by the support; and
   d) a case at least partially enwrapping the support, the at least one tubular member and the conductive matrix,
   wherein the heat exchanger module is flexible, wherein the at least one tubular member comprises at least two elongated hollow bodies or body sections such that a minimum normalised spacing between the elongated hollow bodies or body sections is defined as s/d, where s is the centre-to-centre spacing between any two adjacent elongated hollow bodies or hollow body sections and d their external diameter, and wherein s/d is at least 6.

2. The heat exchanger module according to claim 1, wherein the support comprises a thin film of a thermally conductive material, a net support of a thermally conductive material or a wire rope mesh.

3. The heat exchanger module according to claim 1, wherein the at least one tubular member comprises a fluid having a thermal conductivity at 20° C. greater than 0.5 W/(m·° C.), preferably between about 0.5 and 10 W/(m·° C.).

4. The heat exchanger module according to claim 3, wherein the fluid is at least one of an aqueous solution including water, a non-polar solution, carbon dioxide and liquids comprising conductive particles.

5. The heat exchanger module according to claim 1, wherein the at least one tubular member is configured as a serpentine structure distributed along the plane in the thermally conductive matrix.

6. The heat exchanger module according to claim 1, wherein the at least one tubular member is substantially made of a material having a thermal conductivity at 20° C. greater than 0.2 W/(m·° C.), preferably between about 0.2 and 400 W/(m·° C.).

7. The heat exchanger module according to claim 1, wherein the conductive matrix is in the form of a paste, a gel, a hydrogel or a semi-solid soft matrix having a thermal conductivity at 20° C. greater than 0.1 W/(m·° C.), preferably between about 1 and 100 W/(m·° C.).

8. The heat exchanger module according to claim 1, wherein the conductive flexible matrix comprises a polymeric matrix comprising at least one of a thermoset, a thermoplastic and an elastomer.

9. The heat exchanger module according to claim 1, wherein the heat exchanger module further comprises at least one steam break sheet.

10. The heat exchanger module according to claim 9, wherein the steam break sheet is placed between the conductive flexible matrix and the case.

11. The heat exchanger module according to claim 1, wherein the elongated hollow bodies or body sections run substantially parallel to each other.

12. The heat exchanger module according to claim 1, wherein the conductive matrix comprises tar oil.

13. The heat exchanger module according to claim 1, wherein the support is a galvanized electro-welded net, the at least one tubular member is a serpentine structure substantially made of a material selected from a list comprising or consisting of a thermoset material, a thermoplastic material and a metal, and the conductive matrix is substantially made of a material selected from a list comprising or consisting of tar oil, an elastomeric glue and a metal particles/elastomeric glue composite.

14. The heat exchanger module according to claim 1, wherein the heat exchanger module is a geothermal heat exchanger module.

15. A coating for a built environment comprising a plurality of heat exchanger modules according to claim 1.

16. A system comprising:
   i) a heat exchanger module according to claim 1, and/or a coating for a built environment comprising a plurality of the heat exchanger modules, and
   ii) pumping means operatively connected to the at least one tubular member of the heat exchanger module and/or coating.

17. The use of:
   the heat exchanger module according to claim 1,
   a coating for a built environment comprising a plurality of the heat exchanger modules, and/or
   a system that also includes pumping means operatively connected to the at least one tubular member of the heat exchanger module and/or coating,
   wherein the use provides heat exchange processes between the heat exchanger module, the coating and/or the system on the one hand, and a built environment on the other hand.

18. The use according to claim 17, wherein the built environment has a temperature having a variation of maximum ±5° C.

19. A method for providing heat exchange in a built environment comprising the steps of:
   a) applying:
      the heat exchanger module according to claim 1,
      a coating for the built environment comprising a plurality of the heat exchanger modules, and/or
      a system that also includes pumping means operatively connected to the at least one tubular member of the heat exchanger module and/or coating; and
   b) circulating a fluid within the at least one tubular member of the heat exchanger module and/or coating.

20. The method of claim 19, wherein the built environment has a temperature having a variation of maximum ±5° C.

* * * * *